Jan. 8, 1952  J. W. IRBY ET AL  2,581,416
SPRING SHOCK AND VIBRATION ISOLATOR
Filed Oct. 2, 1945  2 SHEETS—SHEET 1

INVENTOR
WILBUR JOHANNESBURG
JAMES W. IRBY
BY
*William D. Hall*
ATTORNEY

Jan. 8, 1952 J. W. IRBY ET AL 2,581,416
SPRING SHOCK AND VIBRATION ISOLATOR
Filed Oct. 2, 1945 2 SHEETS—SHEET 2

INVENTOR
WILBUR JOHANNESBURG
JAMES W. IRBY
BY
William D. Hall
ATTORNEY

Patented Jan. 8, 1952

2,581,416

UNITED STATES PATENT OFFICE 2,581,416

SPRING SHOCK AND VIBRATION ISOLATOR

James W. Irby, Dayton, and Wilbur Johannesburg, Cleveland Heights, Ohio, assignors to the United States of America as represented by the Secretary of War Application October 2, 1945, Serial No. 619,910

1 Claim. (Cl. 248—21)

(Granted under the act of March 3, 1883, as amended April 30, 1928; 370 O. G. 757)

The invention described herein may be manufactured and used by or for the Government for governmental purposes, without the payment to us of any royalty thereon.

The invention to be hereinafter described relates to vibration isolators.

In the past, a great many devices have been developed for isolating vibrations. Airplanes and motor vehicles have tremendously emphasized the need for isolating devices, with resulting multiplication of such devices, many especially aimed at use in planes and motor vehicles.

Rubber in various forms and variously combined with metal parts has been used in many such devices. As a material, rubber has many disadvantages. After a time, whether used or not, it loses its resilience or becomes dead. Under certain atmospheric conditions it rots or deteriorates seriously. In low temperatures rubber solidifies and loses its elasticity. At elevated temperatures rubber correspondingly loses its elasticity; above well known temperatures it softens and, eventually, melts. In such changed condition its elasticity is completely destroyed.

In a wide variety of known combinations with metal plates or discs it possesses a plurality of natural frequencies or points of resonance.

On the other hand, it is a well known fact that a conically arranged spirally wound metal spring has a single natural frequency or point of resonance which may be readily determined in well known manner.

The present invention comprises, among other elements, spirally wound, conically shaped metal springs of a special construction, together with helper springs of a cantilever type, and a rubber buffer functioning only on compression and to offset excessive shock acceleration.

The present invention eliminates or greatly minimizes the hereinabove mentioned and other objections and provides a simple, efficient and compact vibration isolation device which may be readily made from easily obtainable materials at relatively low cost.

In order to more clearly disclose the construction, operation and use of the invention, reference should be had to the accompanying drawings forming part of the present application. Throughout the several figures of the drawings like reference characters designate the same parts in the different views.

Figure 1:
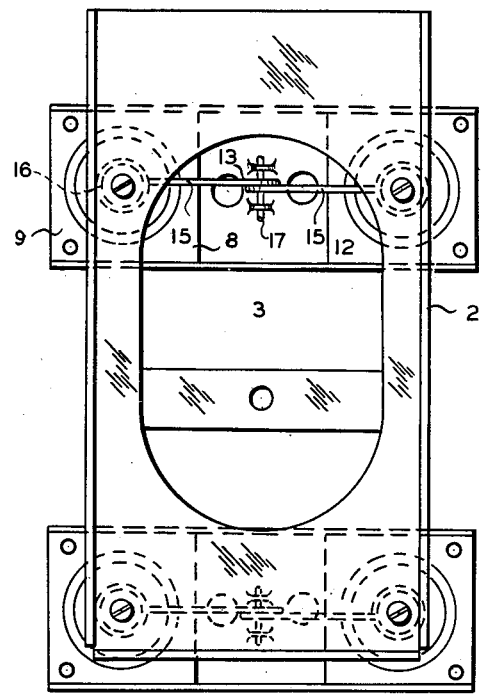
Fig. 1 is a top plan view, showing the invention applied.

When an object on the rack of an isolation device of the character described is vibrated in such amplitude that the elastic limit of the springs is exceeded there will be a tendency of the connecting springs to stretch, thereby destroying their usefulness as vibration isolators. Although a simple assembly of supporting rack and a plurality of interposed vibration isolators, in accordance with the present invention, has been shown, as applied or assembled for use with any device or object which may be mounted on or carried by the rack, it will be obvious that there are a great many other applications of the invention all of which are equally within the intended field. The construction and arrangement illustrated are merely one preferred form.

The base 1 is representative only. It may be a table, bench framework or an integral part of an airplane frame or a similar construction or arrangement. A frame 2 of suitable construction and adapted to support or carry the load of the object, a subject to vibration, is provided. In the case of planes, the load may be a motor, a piece of radio equipment, a compass or various other objects.

Between this supporting frame 2 and the base 1 are disposed the vibration isolating devices comprised within this invention. In order to insure a firm base for the isolators suitable metal plates are provided. As a matter of convenience, these plates may be made as oblong strips adapted to extend the full width of the frame 2 and to provide a rigid foundation for two spring units of this invention, one at each end. Obviously, circumstances will have much to do with determining the number and distribution of the vibration isolation elements of this invention and with the corresponding plates 3. A load concentrated in small space, for instance, will permit more closely disposed isolation elements than one occupying greater space. Likewise, a load in which the center of gravity is not approximately coincident with its geometrical center will require a correspondingly different disposition or arrangement of the isolation elements, all as will be well understood.

In the instance illustrated, four isolation elements have been shown distributed adjacent the four corners of frame 2 and, themselves defining the corners of an oblong or rectangle.

Each isolation element comprises a spirally wound, conically formed, shaped or disposed metal spring 4, the large diameter end or base, in assembled relation, resting on base 1 through the respective intermediate plate 3, while the apex or small diameter end, as will more clearly hereinafter appear, is connected to the supporting frame 2.

Coil spring 4 is, in no sense, a conical spring of usual and well known type. It is especially designed and constructed to operate very differently than the usual conical spring, as will hereinafter be more clearly set forth.

Integrally formed in plates 3, according to any suitable method or process are a pair of frustoconical bumper heads 5 one at each end. Plates 3 adjacent heads 5 are provided with anchoring or socket holes 6 to receive the deflected end 7 of the base or large diameter coil of spring 4, when in operative position.

In order to securely, though detachably, hold each spring 4, to its plate or base, an anchoring flange plate 8 is provided. It may be secured to plate 3 in any well known manner It is formed with a central circular opening of appreciably greater diameter than the base of bumper head 5 and has an annular flange 9 deflected perpendicularly relatively to the plane of plates 3 and 8. The flange 9 is radially spaced from the base of the bumper head 5 amply to allow free passage of the base coil of spring 4 between it and the bumper head. It is amply spaced from plate 3 to permit passage of the base coil of the spring thereunder. Its greatest diameter, where it merges into 3, is approximately equal to the outside diameter of the base or bottom coil of the spring 4, under normal conditions. With the lower or base coil of a spring beneath and overlapped by the annular flange 9 and the end 7 seated in hole 6, spring 4 is securely anchored to plate 3. While parts 3 and 8 have been referred to as separate it is to be understood that they may be integrally formed.

Within spring 4 and, preferably, spirally externally grooved to receive and seat the smaller diameter coils of the upper end or top of the spring 4, is a conical rubber bumper, buffer or shock absorber 10 provided with an anchor tube 11 adapted to receive a cooperating bolt or screw 12 passed through the frame 2 and threaded into 11. Due to the cooperating tapers of spring 4 and the rubber block 10, tightening of screw 12 in anchor tube 11 tightens spring 4 in operative position. This is a simple and preferred construction, however, it will be well understood that other suitable connections may be used.

Figure 2:
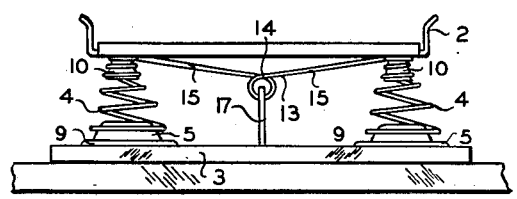
Fig. 2 is an end view of Fig. 1.
Figure 3:
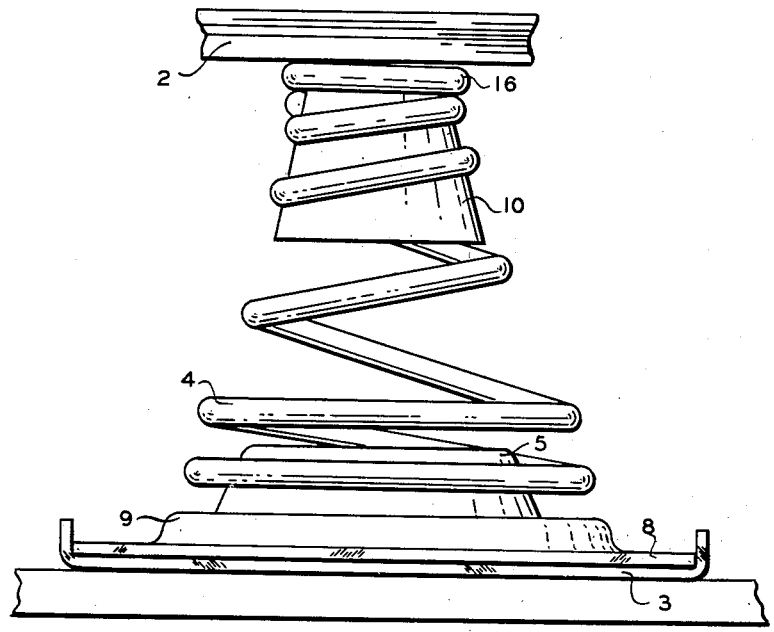
Fig. 3 is a fragmentary view, showing, enlarged, one vibration isolating unit.
Figure 4:
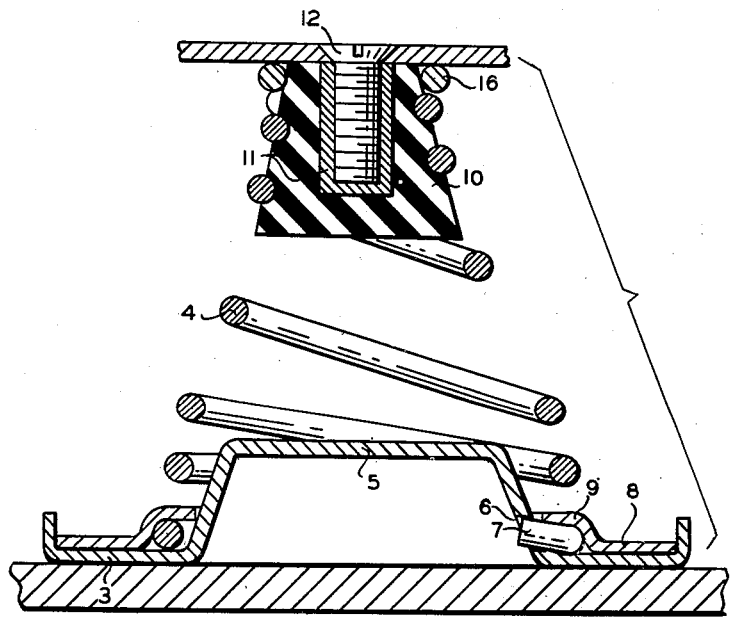
Fig. 4 is an enlarged central vertical cross section through one vibration isolating unit of the invention.

In combination with the above a helper spring is used, each helper spring cooperating with both of a pair of the above spring units. A preferred construction and arrangement of helper spring is shown in Fig. 2 of the drawings and is disposed as a cantilever. It is designated, as a whole, by the numeral 13 and comprises a central resilient coil 14 providing further yielding resilient resistance. In continuation of this coil are two resilient or spring cantilever arms 15. These arms terminate in eyes 16 adapted to be positioned between spring 4 and frame 2 and to receive the upper end of block 10. The central loop or coil 14 of the helper spring is securely anchored to spring supporting plate 3 or to base 1 by a hook, staple or other suitable device 17.

As hereinabove stated the spring 4 is of special construction.

It has been well established that in interposing conical coil springs between a base and an object being vibrated or a frame carrying such an object, the base or bottom helix and the apex or top two coils or helices act substantially entirely as connecting or attaching means and perform practically no vibration isolation function. It has also been clearly established that the helices or coils which are more closely spaced are more sensitive to vibration and therefore have less isolating effect. It is a known fact that the sensitivity to vibration is approximately proportional to helix diameter, increasing with increasing diameter. As vibrations from the object on the frame reach the springs they are transmitted through the springs.

Since the vibrations impinge on the frame 2, they will pass into the springs through the small diameter widely spaced active helices and be transmitted to the more closely spaced helices of greater diameter. These several larger diameter, more closely spaced, helices will isolate vibrations received to the full extent of their capacities. When the amplitude of the vibrations exceeds the capacity of those helices the next adjacent more widely spaced helices of less diameter will come into play, isolating vibrations of greater amplitude. As will be clear on reference to the drawings, the successive helices are of progressively increasing diameter. This difference in diameter is sufficient to, also, in emergency, permit the helices to telescope one within the other and prevent banking one upon the other. Thus, it will be seen that of the larger diameter active helices, the second will be proportionately less sensitive than the first. The same is true of the second of the smaller diameter and more widely spaced active helices.

The conical springs, as complete units or elements, are designed to isolate vibration to and including predetermined amplitudes.

Beyond those amplitudes and within another predetermined field the helper springs 13—17 come into play. As the amplitude of vibrations exceeds that of the conical springs and there is a tendency to extend or stretch the coil springs beyond their normal condition, the helper spring, in operative engagement with the coil springs, has transmitted to it the vibrations of greater amplitude. It, in turn, isolates vibrations to the full extent of its capacity. In its function as a vibration isolator the helper spring is designed to isolate the vibrations of greatest amplitude for which the device, as a whole, has been devised and constructed.

The helper spring also has a shock acceleration absorbing function. Whenever there is sudden acceleration such as due to shock the helper spring relieves the coil springs of that load, as will be readily understood.

While the helper spring does operate to absorb shock acceleration it is not practical to design it to meet such accelerations beyond certain points. For such contingencies the buffer block 10 operates. As such acceleration, in a spring compressing direction, exceeds a predetermined point, the buffer 10 will engage the bumper head 5 and compression of the buffer will isolate the shock acceleration within the capacity of the rubber bumper or buffer.

Many changes may be made in the construction, arrangement and disposition of the various parts of the invention within the scope of the appended claim without departing from the field of the invention and it is meant to include all such within this application wherein only our preferred construction has been illustrated, purely by way of example and with no thought or intent to, in any degree, limit the invention thereby.

Having thus described our invention what we claim and desire to protect by Letters Patent is:

In a vibration isolator, two spirally wound conical springs having intermediate helices axially spaced at greater distances than the remaining helices and succeeding helices of such respective diameters as to allow telescoping thereof, means for anchoring base helices of said springs in operative position, means for anchoring apex helices of said springs in operative position, a cantilever type helper spring operatively connected to each of said two coils and means for anchoring said helper spring in operative position.

JAMES W. IRBY.
WILBUR JOHANNESBURG.

REFERENCES CITED

The following references are of record in the file of this patent:

UNITED STATES PATENTS

| Number | Name | Date |
| --- | --- | --- |
| 431,250 | Cliff | July 1, 1890 |
| 1,089,748 | Clark | Mar. 10, 1914 |
| 1,114,417 | Turton | Oct. 20, 1914 |
| 1,319,949 | Curran et al. | Oct. 28, 1919 |
| 1,320,288 | Stewart | Oct. 28, 1919 |
| 1,382,112 | Mitchell | June 21, 1921 |
| 1,602,337 | Chandler | Oct. 5, 1926 |
| 1,734,806 | Haynes | Nov. 5, 1929 |
| 1,987,365 | Rice | Jan. 8, 1935 |
| 1,988,295 | Berry | Jan. 15, 1935 |
| 2,097,418 | Oelkers | Oct. 26, 1937 |
| 2,289,514 | Mastrey et al. | July 14, 1942 |

FOREIGN PATENTS

| Number | Country | Date |
| --- | --- | --- |
| 192,578 | Great Britain | Feb. 8, 1923 |
| 206,316 | Great Britain | Nov. 8, 1923 |
| 305,969 | Great Britain | Feb. 13, 1929 |
| 509,121 | Great Britain | July 11, 1939 |